US010347160B2

(12) United States Patent
Takayanagi et al.

(10) Patent No.: US 10,347,160 B2
(45) Date of Patent: Jul. 9, 2019

(54) ELECTRONIC APPARATUS HAVING ROLLABLE DISPLAY DEVICE

(71) Applicant: Samsung Electronics Co., Ltd., Suwon-si, Gyeonggi-do (KR)

(72) Inventors: Toshikazu Takayanagi, Suwon-si (KR); Chang-bong Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 136 days.

(21) Appl. No.: 15/015,412

(22) Filed: Feb. 4, 2016

(65) Prior Publication Data

US 2016/0324021 A1 Nov. 3, 2016

Related U.S. Application Data

(60) Provisional application No. 62/155,033, filed on Apr. 30, 2015.

(30) Foreign Application Priority Data

Aug. 26, 2015 (KR) .................. 10-2015-0120540

(51) Int. Cl.
*G06F 9/30* (2018.01)
*G09F 9/30* (2006.01)
(Continued)

(52) U.S. Cl.
CPC ............ *G09F 9/301* (2013.01); *G06F 1/1601* (2013.01); *G06F 1/1652* (2013.01); *G09F 11/29* (2013.01); *G06F 2200/1612* (2013.01)

(58) Field of Classification Search
CPC ... E06B 9/56; E06B 9/74; G03B 21/58; G06F 1/1601; G06F 1/1652; G09F 9/301; H05K 5/0017; H05K 7/16
See application file for complete search history.

(56) References Cited

U.S. PATENT DOCUMENTS 7,395,850 B2 7/2008 Chino et al.
8,493,726 B2 7/2013 Visser et al.
(Continued)

FOREIGN PATENT DOCUMENTS

JP          5284238 B2    9/2013
KR     1998-0087721 A    12/1998
KR   10-2012-0093665 A    8/2012

OTHER PUBLICATIONS

European Office Action dated Apr. 1, 2019; Reference #: RPG/P231719EP; Application #/Patent #: 16156080.0-1221 /3088986.

*Primary Examiner* — David R Dunn
*Assistant Examiner* — Christopher E Veraa
(74) *Attorney, Agent, or Firm* — Jefferson IP Law, LLP

(57) ABSTRACT

An electronic apparatus is provided. The apparatus includes a first body and a second body configured to move with respect to each other, a rollable display, a roller rotatably supported in the first body, wherein a first end portion of the rollable display is fixed to the roller and the rollable display is wound around an outer circumference of the roller, and a tensile force application portion configured to apply an elastic force to the roller to rotate in a direction to wind the display, the tensile force application portion rotating with the roller, in which, as the first body and second body move with respect to each other, the rollable display is wound around the roller to be accommodated in the first body or is released from the roller to expanding between the first body and the second body in a length direction.

17 Claims, 13 Drawing Sheets

(51) Int. Cl.
*G06F 1/16* (2006.01)
*G09F 11/29* (2006.01)

(56) References Cited

U.S. PATENT DOCUMENTS

| | | |
|---|---|---|
| 8,516,728 B2 | 8/2013 | Jung |
| 8,654,519 B2 * | 2/2014 | Visser .................... G09F 9/00 361/679.21 |
| 9,004,138 B2 | 4/2015 | Okachi et al. |
| 2002/0054030 A1 | 5/2002 | Murphy |
| 2004/0183958 A1 * | 9/2004 | Akiyama ................ G09F 9/30 349/58 |
| 2005/0040962 A1 * | 2/2005 | Funkhouser .......... G06F 1/1601 340/815.4 |
| 2005/0041012 A1 * | 2/2005 | Daniel .................. G06F 1/1601 345/156 |
| 2009/0302176 A1 | 12/2009 | Kuroi et al. |
| 2011/0043976 A1 | 2/2011 | Visser et al. |
| 2011/0176260 A1 | 7/2011 | Walters et al. |
| 2012/0204453 A1 * | 8/2012 | Jung .................... G09F 9/301 40/517 |
| 2013/0312920 A1 * | 11/2013 | Mullet .................... E06B 9/40 160/310 |
| 2014/0092566 A1 * | 4/2014 | Shirasaka ............ H05K 5/0017 361/749 |
| 2014/0211399 A1 * | 7/2014 | O'Brien ................ G06F 1/1624 361/679.26 |
| 2015/0009636 A1 * | 1/2015 | Jeong .................... B65H 18/10 361/749 |
| 2015/0029229 A1 * | 1/2015 | Voutsas ................ G06F 1/1652 345/661 |
| 2015/0226001 A1 * | 8/2015 | Adams .................... E06B 9/72 160/84.02 |
| 2016/0187929 A1 * | 6/2016 | Kim .................... G06F 1/1652 345/184 |

\* cited by examiner

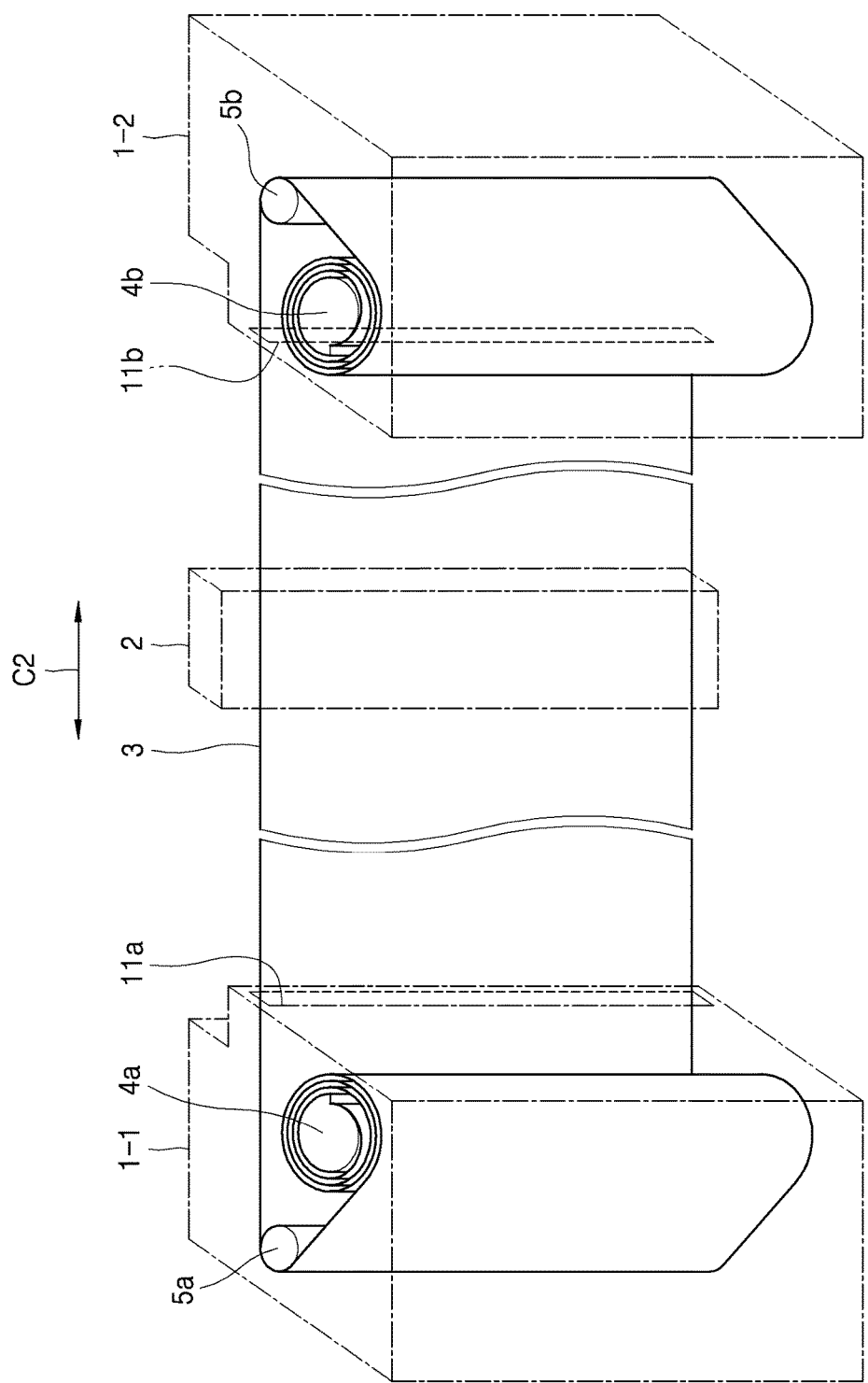

ELECTRONIC APPARATUS HAVING ROLLABLE DISPLAY DEVICE

CROSS-REFERENCE TO RELATED APPLICATION(S)

This application claims the benefit under 35 U.S.C. § 119(e) of a U.S. provisional application filed on Apr. 30, 2015 in the U.S. Patent and Trademark Office and assigned Ser. No. 62/155,033, and under 35 U.S.C. § 119(a) of a Korean patent application filed on Aug. 26, 2015 in the Korean Intellectual Property Office and assigned Serial number 10-2015-0120540, the entire disclosure of each of which is hereby incorporated by reference.

TECHNICAL FIELD

The present disclosure relates to an electronic apparatus having a rollable display device.

BACKGROUND

Electronic apparatuses such as televisions, monitors, communication terminals, game devices, multimedia devices, portable computers, photographing apparatuses, etc. include a display for displaying image information. Since traditional displays are not bendable or foldable, the size of a display determines the size of an electronic apparatus having the display. Accordingly, when a large display is used, the size of an electronic apparatus increases.

With the development of flexible displays capable of being bent in a round shape, an electronic apparatus capable of keeping a display wound around a roller and releasing the display from the roller to expand in a flat shape has been suggested. In order for the display to flatly expand when released from the roller, a tensile force is applied to the display. To this end, an elastic force is applied to the roller in a direction to wind the display.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus having a rollable display device.

One or more embodiments include an electronic apparatus having a rollable display device, in which a tensile force may be applied to a display.

One or more embodiments include an electronic apparatus having a rollable display device, in which a display may be wound around a roller.

One or more embodiments include an electronic apparatus having a rollable display device, in which an electrical connection between a display and a controller may be maintained.

Additional aspects will be set forth in part in the description which follows and, in part, will be apparent from the description, or may be learned by practice of the presented embodiments.

In accordance with an aspect of the present disclosure, an electronic apparatus is provided. The electronic apparatus includes a first body and a second body configured to move with respect to each other, a rollable display, a roller rotatably supported in the first body, wherein a first end portion of the rollable display is fixed to the roller and the rollable display is wound around an outer circumference of the roller, and a tensile force application portion configured to apply an elastic force to the roller to rotate in a direction to wind the rollable display, the tensile force application portion rotating with the roller, in which, as the first body and the second body move with respect to each other, the rollable display is wound around the roller to be accommodated in the first body or is released from the roller to expanding between the first body and the second body in a length direction.

The tensile force application portion may rotate in proportion to an expansion distance of the rollable display.

The tensile force application portion may include a rotation support member supported on the first body to be rotatable in proportion to the expansion distance of the rollable display, and a torsion spring having a first end portion connected to the roller and a second end portion connected to the rotation support member.

The electronic apparatus may further include a motor configured to rotate the rotation support member in proportion to the expansion distance of the rollable display.

The electronic apparatus may further include a motor configured to move the first body with respect to the second body, in which the rotation support member rotates by the motor.

The electronic apparatus may further include a support member comprising a plurality of segmented links sequentially connected to be relatively pivotable in the length direction, the support member being accommodated in the first body with the rollable display and expanding from the first body to support the rollable display, in which the tensile force application portion rotates by being connected to the support member.

The tensile force application portion may include a rotation support member rotated by being connected to the support member, and a torsion spring having a first end portion connected to the roller and a second end portion connected to the rotation support member.

The electronic apparatus may further include a sprocket rotatably provided in the first body to move the support member, in which the rotation support member rotates by being connected to the sprocket.

The electronic apparatus may further include a motor configured to rotate the sprocket.

The electronic apparatus may further include a controller configured to control the rollable display, and a flexible connection member comprising a spiral portion spirally wound multiple times, a first connection portion extending from the spiral portion and connected to a terminal portion of the rollable display, and a second connection portion extending from the spiral portion and connected to the controller.

A number of windings of the spiral portion may be equal to or greater than a maximum winding number of the rollable display around the roller.

A winding direction of the spiral portion may be same as a winding direction of the rollable display around the roller.

The electronic apparatus may further include a sub-body, the sub-body having a sub-body roller rotatably supported in the sub-body, wherein a second end of the rollable display is fixed to the sub-body roller and the rollable display is wound around an outer circumference of the sub-body roller, and a sub-body tensile force application portion configured to apply an elastic force to the sub-body roller to rotate in a direction to wind the rollable display, the tensile force application portion rotating with the sub-body tensile roller.

In accordance with another aspect of the present disclosure, an electronic apparatus is provided. The electronic apparatus includes a first body and a second body configured to move with respect to each other, a roller rotatably supported in the first body, a rollable display wound around the roller, the rollable display being wound around the roller to be accommodated in the first body or released from the roller to be expanding between the first body and the second body in a length direction when the first body and the second body move with respect to each other, a torsion spring having a first end connected to the roller, and a rotation support member, wherein a second end of the torsion spring is connected to the rotation support member and the rotation support member is supported in the first body to be rotatable in proportion to an expansion distance of the rollable display.

The electronic apparatus may further include a motor configured to rotate the rotation support member in proportion to the expansion distance of the rollable display.

The electronic apparatus may further include a support member comprising a plurality of segmented links sequentially connected to be relatively pivotable in the length direction, the support member being accommodated in the first body with the rollable display and expanding from the first body to support the rollable display, in which the rotation support member rotates by being connected to the support member.

The electronic apparatus may further include a sprocket rotatably provided in the first body to move the support member, in which the rotation support member rotates by being connected to the sprocket.

The electronic apparatus may further include a motor configured to rotate the sprocket.

According to various embodiments, an electronic apparatus includes a first body and a second body configured to move with respect to each other, a rollable display wound around the roller, the rollable display being wound around the roller to be accommodated in the first body or released from the roller to expanding between the first body and the second body in a length direction when the first body and the second body move with respect to each other, a controller configured to control the rollable display, and a flexible connection member that includes a spiral portion spirally wound multiple times, a first connection portion extending from the spiral portion and connected to a terminal portion of the rollable display, and a second connection portion extending from the spiral portion and connected to the controller.

A number of windings of the spiral portion may be equal to or greater than a maximum winding number of the rollable display around the roller.

A winding direction of the spiral portion may be same as a winding direction of the rollable display around the roller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 is a schematic perspective view of an electronic apparatus having a rollable display device in an extended position according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
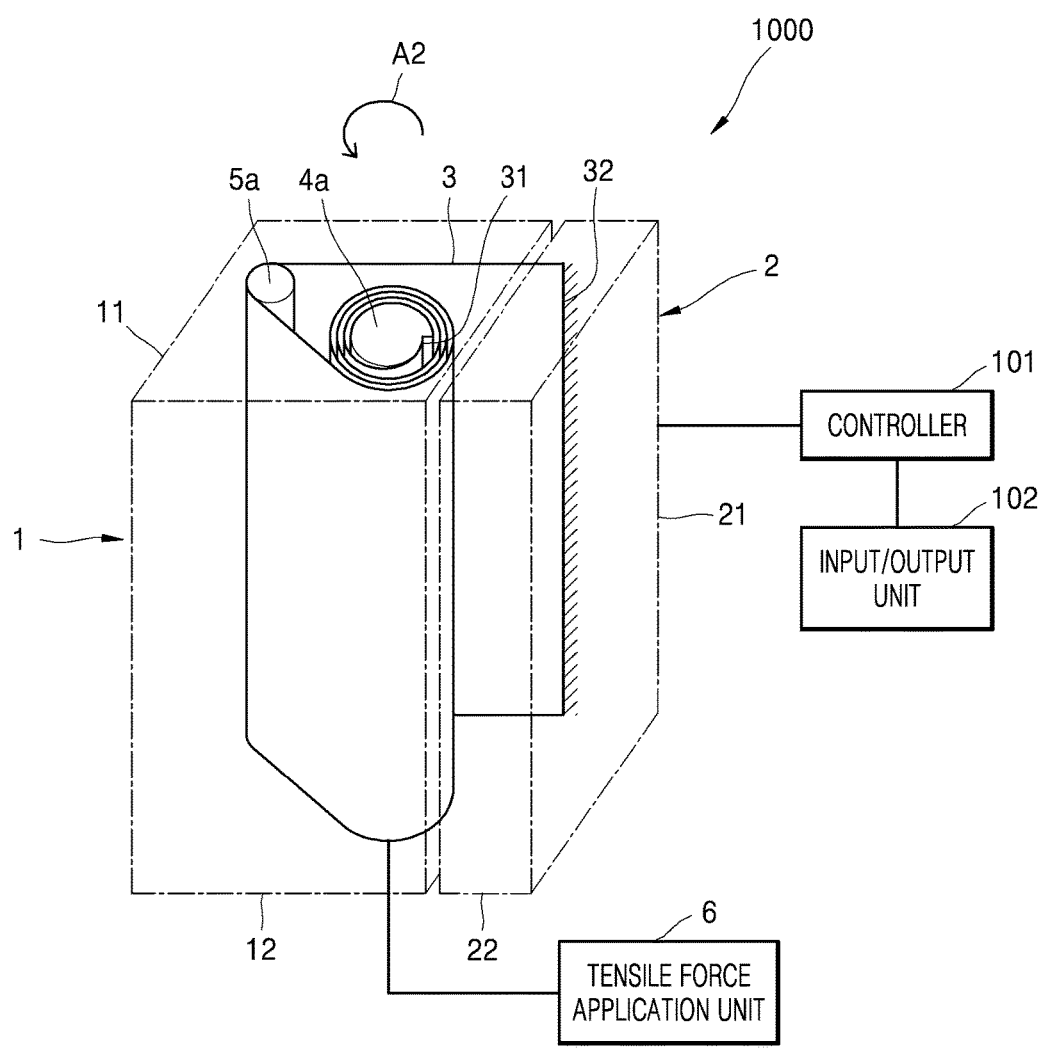
FIG. 1 is a schematic perspective view of an electronic apparatus having a rollable display device in a retracted position according to an embodiment of the present disclosure.
Figure 2:
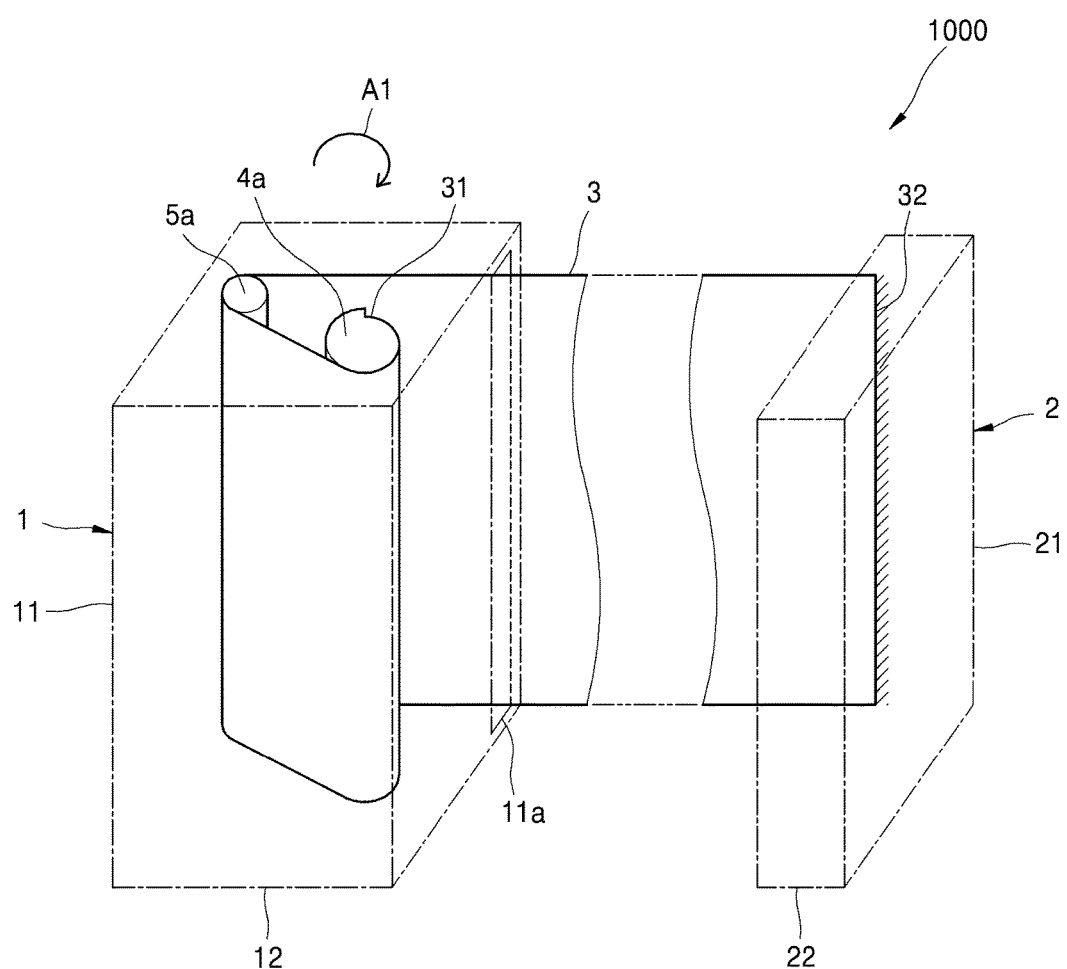
FIG. 2 is a schematic perspective view of an electronic apparatus having a rollable display device in an extended position according to an embodiment of the present disclosure.

FIG. 1 is a schematic perspective view of an electronic apparatus having a rollable display device in a retracted position according to an embodiment of the present disclosure. FIG. 2 is a schematic perspective view of an electronic apparatus having a rollable display device in an extended position according to an embodiment of the present disclosure.

Referring to FIGS. 1 and 2, the electronic apparatus 1000 may include a first body 1 and a second body 2. A rollable display 3 may be provided across the first body 1 and the second body 2. One end portion 31 of the rollable display 3 is supported on the first body 1, whereas the other end portion 32 of the rollable display 3 is supported on the second body 2. A roller 4a may be rotatably provided at the first body 1. The one end portion 31 of the rollable display 3 is connected to the roller 4a. The rollable display 3 is wound around an outer circumference of the roller 4a. The first body 1 and the second body 2 include a first housing 11 having a lower surface 12 and a second housing having a lower surface 22, respectively. When the rollable display 3 is wound around the roller 4a, the rollable display 3 is disposed in the first housing 11. The other end portion 32 of the rollable display 3 may be accommodated in the second housing 21. For example, the other end portion 32 of the rollable display 3 may be fixed in the second housing 21.

When the roller 4a rotates in a first direction A1, the rollable display 3 is released from the roller 4a and extended from the first body 1 through an opening 11a provided in the first housing 11. When the first and second bodies 1 and 2 are separated from each other the rollable display 3 expands between the first and second bodies 1 and 2. When the roller 4a rotates in the second direction A2, which is opposite to the first direction A1, the rollable display 3 is wound around the roller 4a to retract the rollable display 3. When the first and second bodies 1 and 2 are approaching each other, the rollable display 3 is wound around the roller 4a and accommodated in the first body 1. A guide roller 5a guides the rollable display 3 through the opening 11a in the first body 1.

Figure 3:
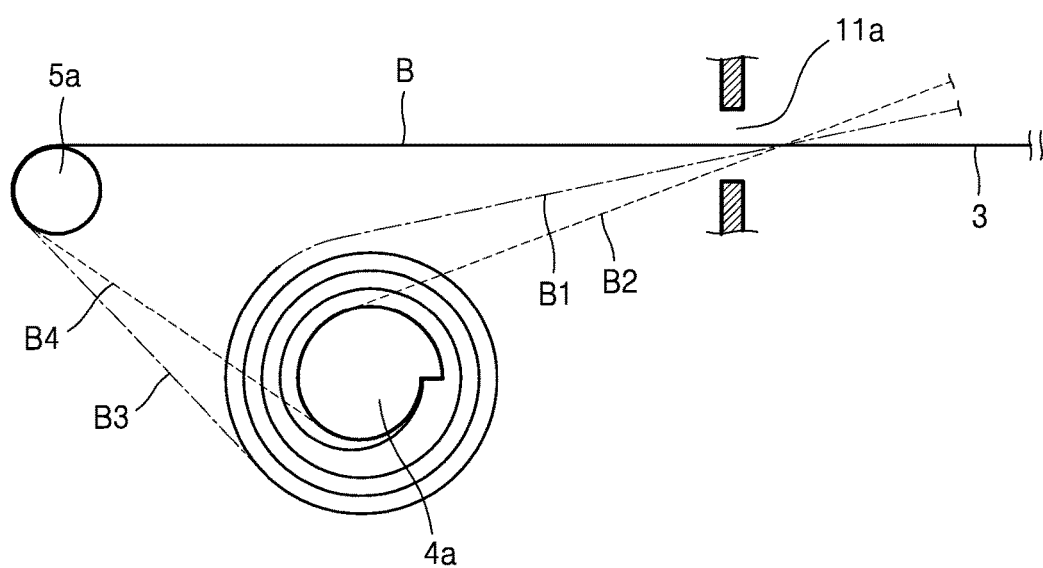
FIG. 3 is a plan view illustrating an operation of a guide roller according to an embodiment of the present disclosure.

FIG. 3 is a plan view illustrating an operation of the guide roller 5a according to an embodiment of the present disclosure.

Referring to FIG. 3, when the guide roller 5a does not exist and the rollable display 3 is wound around the roller 4a at its maximum, the rollable display 3 moves toward the opening 11a along a path B1. When the rollable display 3 is wound around the roller 4a at its minimum, the rollable display 3 moves toward the opening 11a along a path B2. In other words, a movement direction of the rollable display 3 released through the opening 11a varies according to the amount that the rollable display 3 is wound around the roller 4a. Although the movement direction of the rollable display 3 between the roller 4a and the guide roller 5a varies according to a change in the amount of winding of the rollable display 3 around the roller 4a, as indicated by paths B3 and B4, when the guide roller 5a is present, the movement direction of the rollable display 3 between the guide roller 5a and the opening 11a remains unchanged as indicated by a path B. Thus, the movement direction of the rollable display 3 released through the opening 11a may be maintained constant.

The electronic apparatus 1000 may be televisions, monitors, communication terminals, game devices, multimedia devices, portable computers, photographing apparatuses, etc. Also, the electronic apparatus 1000 may be any device having a structure in which the first body 1 accommodating the roller 4a, around which the rollable display 3 is wound, and the second body 2 approach each other or are separated from each other.

Referring back to FIG. 1, the electronic apparatus 1000 may include a controller 101 for performing a function according to a use of the electronic apparatus 1000 and an input/output unit 102 for exchanging information with the outside, for example, inputting/outputting user's operations and inputting display data. For example, when the electronic apparatus 1000 is a multimedia device for reproducing an image and sound, the controller 101 may include an image/sound information processor. The controller 101 is connected to the rollable display 3 to control the rollable display 3. The electronic apparatus 1000 may further include a communication interface module (not shown) to connect to an external apparatus in wired or wireless method as necessary.

The rollable display 3 may include any display that can be flexibly bent to be wound around the roller 4a. For example, the rollable display 3 may be a liquid crystal display (LCD), a light-emitting diode (LED) display, an organic LED (OLED) display, or an electrophoretic display.

The rollable display 3 may have a bending elasticity. The bending elasticity acts as a force applied to the rollable display 3 in a direction to be unbent and, thus, the rollable display 3 tends to open in a radial direction. Accordingly, when the roller 4a rotates in the second direction A2, a rotation force of the roller 4a is not transferred to the rollable display 3 and the rollable display 3 may not be closely wound around the roller 4a. Also, when the roller 4a rotates in the first direction A1, the rotation force of the roller 4a is not transferred to the rollable display 3 and, when the rollable display 3 is released from the roller 4a, the rollable display 3 may be loosely maintained in the first body 1 without being pulled out of the first body 1 through the opening 11a. Also, when the rollable display 3 is pulled from the first body 1, the rollable display 3 may be bent (i.e., not planar).

Accordingly, the electronic apparatus 1000 may include a tensile force application portion 6 to apply an elastic force to the roller 4a to rotate in a direction to wind the rollable display 3. Accordingly, the rollable display 3 may be substantially planar without being bent and the rollable display 3 may be maintained to be closely wound around the roller 4a.

The tensile force application portion 6 may include a torsion spring with one end supported on the roller 4a and the other end supported on the first body 1. Referring to FIG. 1, the torsion spring may apply an elastic force to the roller 4a when the rollable display 3 is fully wound around the roller 4a. In this state, when the first and second bodies 1 and 2 are separated from each other, the roller 4a rotates in the first direction A1. Then, the torsion spring is also twisted in the first direction A1 and an elastic energy is accumulated in the torsion spring. Accordingly, the magnitude of an elastic force applied to the roller 4a is increased. Referring to FIG. 2, when the rollable display 3 is fully extended from the first body 1, the elastic force applied by the torsion spring 63 to the roller 4a is the maximum value.

As such, the magnitude of the elastic force applied to the roller 4a varies according to the amount of winding of the rollable display 3 around the roller 4a and a force to rotate the roller 4a in the first direction A1 increases as the rotation amount of the roller 4a increases. Accordingly, a driving unit having a large driving force to rotate the roller 4a in the first direction A1 is needed. Also, when a user manually rotates the roller 4a in the first direction A1 or separates the first and second bodies 1 and 2 from each other, a greater force is needed to separate the first and second bodies 1 and 2 from each other as a separation distance between the first and second bodies 1 and 2 increases. The elastic force of the torsion spring acts as a tensile force to the rollable display 3. Accordingly, when the tensile force increases, the rollable display 3 may be damaged. Also, when expanding and winding the rollable display 3 is repeated, the connection of the one end portion 31 and the other end portion 32 of the rollable display 3 and the first and second bodies 1 and 2 may be damaged.

According to the present embodiment, the tensile force application portion 6 has a structure to reduce a change in the tensile force applied to the rollable display 3 according to the rotation amount of the roller 4a. For example, the tensile force application portion 6 may be supported on the first body 1 to rotate with the roller 4a in the same direction as the rotation direction of the roller 4a. The tensile force application portion 6 may rotate in proportion to the expanding distance of the rollable display 3 expanding between the first and second bodies 1 and 2.

In the following description, the electronic apparatus 1000 having the tensile force application portion 6 according to the present embodiment is described in detail.

Figure 4:
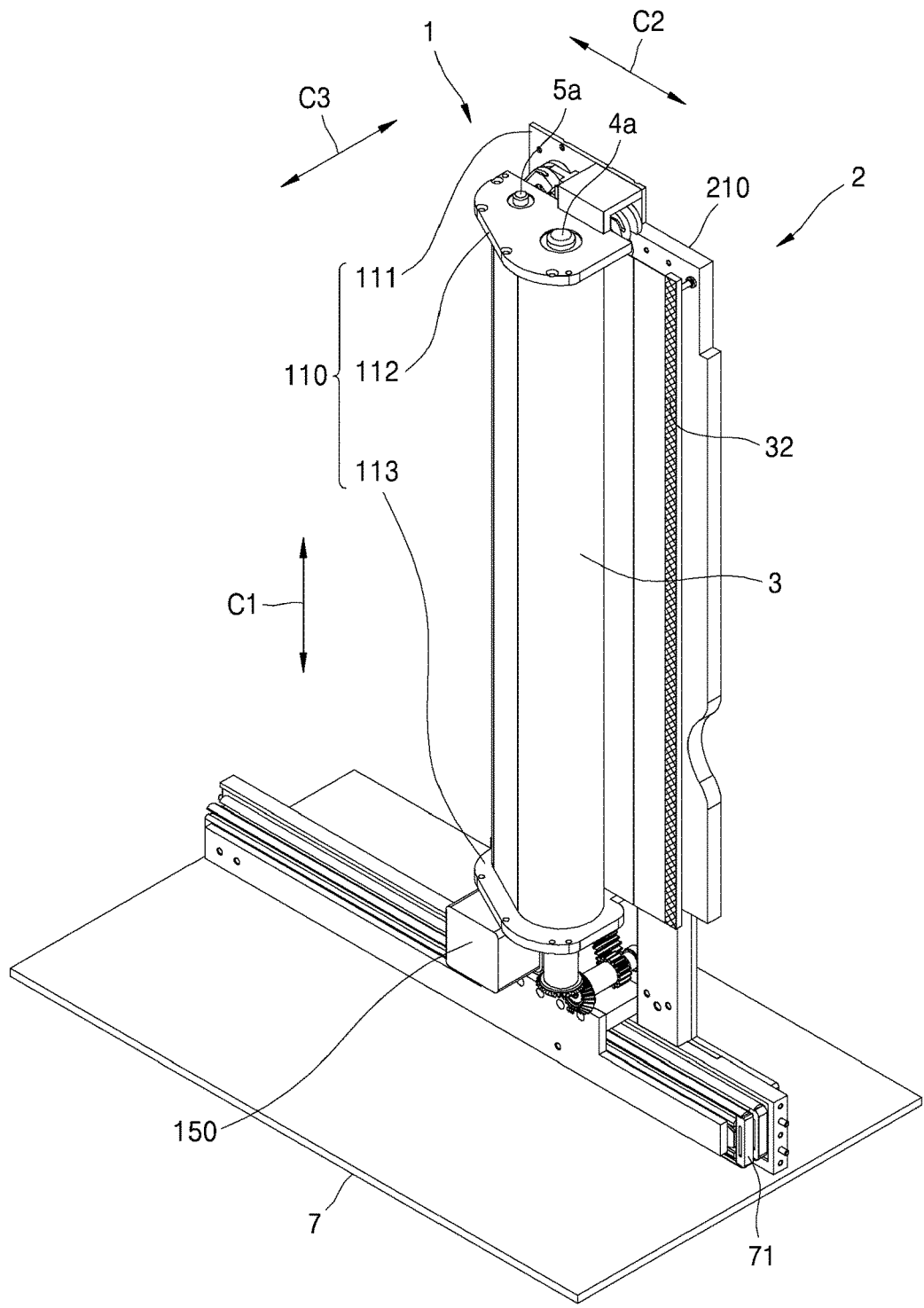
FIG. 4 is a front perspective view of a structure of an electronic apparatus according to an embodiment of the present disclosure.
Figure 5:
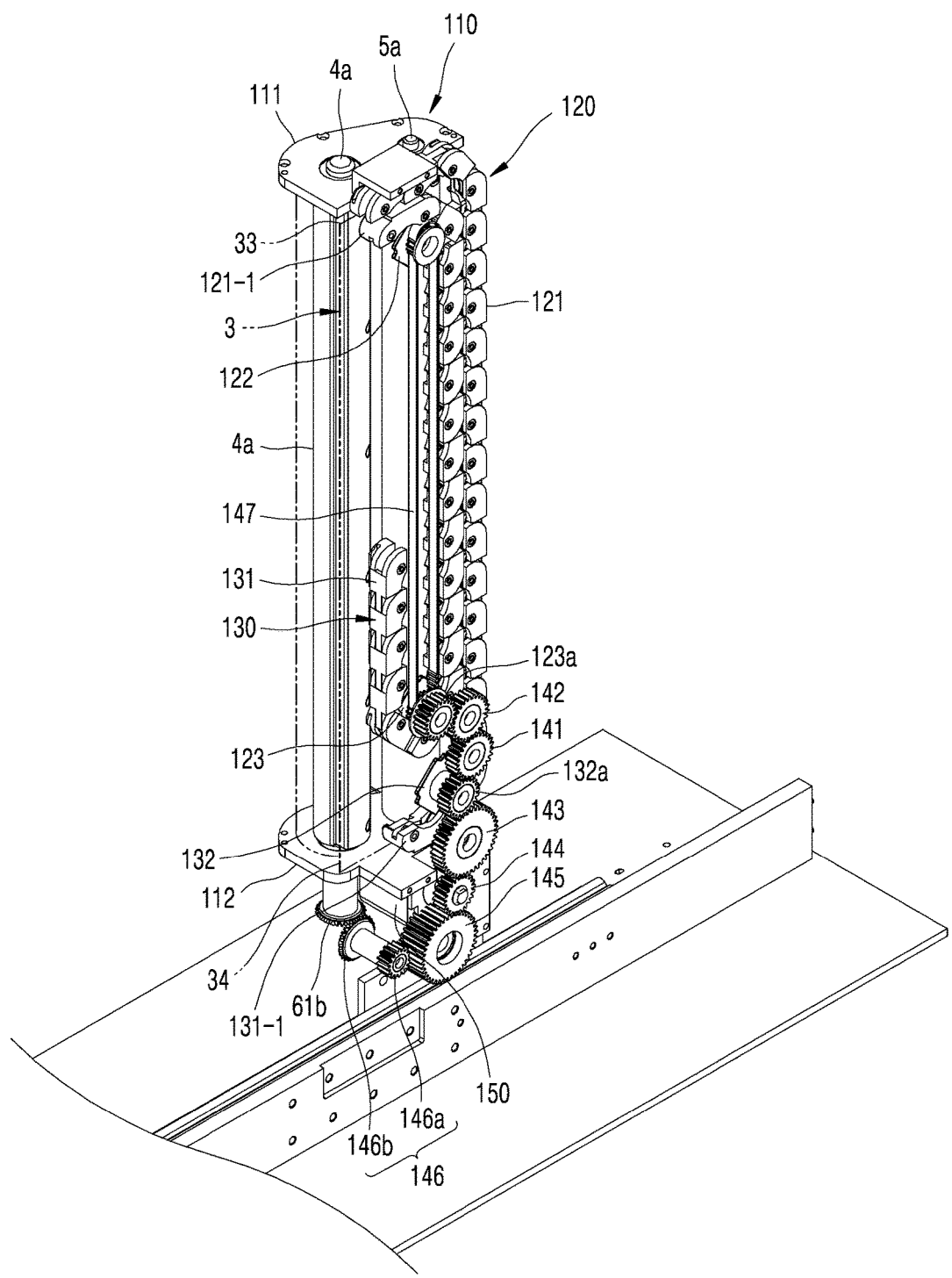
FIG. 5 is a rear perspective view of the electronic apparatus of FIG. 4 according to an embodiment of the present disclosure.
Figure 6:
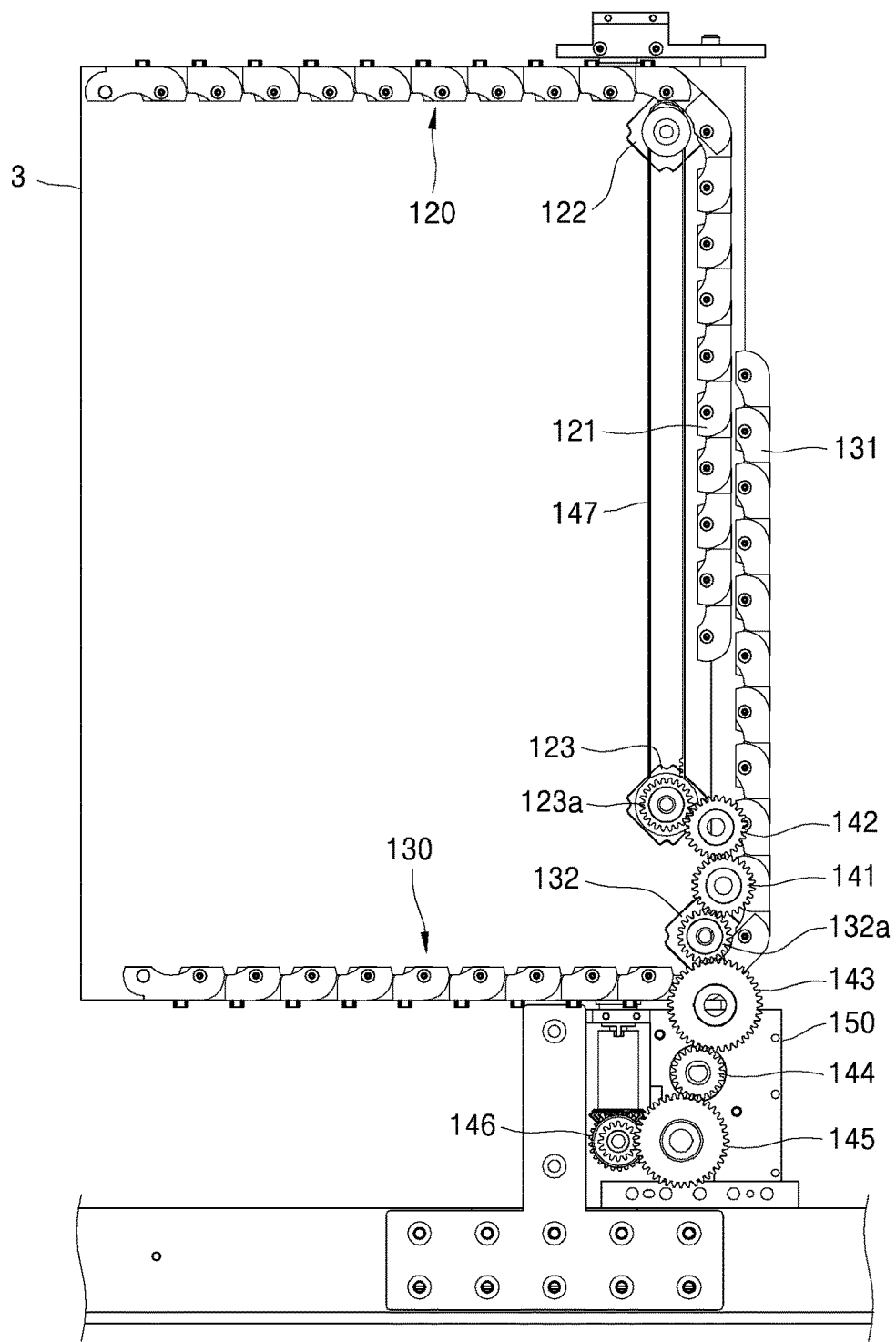
FIG. 6 is a rear view illustrating operations of first and second support members according to an embodiment of the present disclosure.

FIG. 4 is a front perspective view of a structure of the electronic apparatus according to an embodiment of the present disclosure. FIG. 5 is a rear perspective view of the electronic apparatus of FIG. 4 according to an embodiment of the present disclosure. FIG. 6 is a rear view illustrating operations of first and second support members according to an embodiment of the present disclosure.

Referring to FIGS. 4, 5, and 6, portions of the electronic apparatus, such as the first housing 11 and the second housing 21, may be omitted for clarity. The first body 1 may include a frame 110. The frame 110 may include a support plate 111 extending in a width direction C1 of the rollable display 3, and a pair of flanges 112 and 113 extending from the support plate 111 in a thickness direction C3 of the rollable display 3. The roller 4a and the guide roller 5a are rotatably supported on the flanges 112 and 113. The second body 2 may include the fixing plate 210 extending in a length direction C2 of the rollable display 3. The other end portion 32 of the rollable display 3 may be coupled to the fixing plate 210.

The electronic apparatus 1000 may further include a stand 7. The stand 7 is used to place the electronic apparatus 1000 and is not an essential element. For example, when the electronic apparatus 1000 is installed on a ceiling or wall, any one of the first and second bodies 1 and 2 may be fixed on the ceiling or wall and the other one may approach or separate from the fixed one. Also, in the electronic apparatus 1000, the lower surfaces 12 and 22 of the first and second housings 11 and 21 in the width direction C1 may work as an installation surface.

When the stand 7 is present, at least one of the frame 110 and the fixing plate 210 may be supported on the stand 7 to be slidable in the length direction C2 of the rollable display 3. In the present embodiment, the frame 110 is slidably supported on the stand 7. In an example, a slide rail 71 is provided on the stand 7, and the frame 110 may be connected to the slide rail 71. The fixing plate 210 is fixed on the stand 7. According to the above structure, the first body 1 is supported on the stand 7 to be slidable in the length direction C2 of the rollable display 3.

The electronic apparatus 1000 may include a support member for supporting at least one of opposite edges 33 and 34 of the rollable display 3 in the width direction C1 thereof. For example, the electronic apparatus 1000 may include a first support member 120 supporting the edge 33 of the rollable display 3 and/or a second support member 130 supporting the edge 34. The first and second support members 120 and 130 are in the form of a chain in which a plurality of first and second segmented links 121 and 131 are connected to each other to be pivotable with respect to each other. Leading links 121-1 and 131-1 located at the foremost end of the first and second segmented links 121 and 131 may be fixed at the second body 2. First sprockets 122 and 123 and a second sprocket 132 for allowing the first and second support members 120 and 130 to be pulled out of or inserted into the first body 1 are provided in the first body 1.

The first support member 120 is supported on the first sprockets 122 and 123 and accommodated in the first body 1. The number of the first sprockets 122 and 123 is dependent on the number of changes of an accommodation direction of the first support member 120. In the present embodiment, the first support member 120 is accommodated in the first body 1 as the accommodation direction is changed twice by the first sprockets 122 and 123. The first support member 120 is pulled out of the first body 1 or returned to the inside of the first body 1 according to the rotation direction of the first sprockets 122 and 123. According to the rotation direction of the first sprockets 122 and 123, the first support member 120 may be pulled out of the first body 1 in the length direction C2 of the rollable display 3 to be expanding between the first and second bodies 1 and 2 or may be returned to the inside of the first body 1 to be accommodated in the width direction C1 of the rollable display 3.

The second support member 130 is supported on the second sprocket 132. According to the rotation direction of the second sprocket 132, the second support member 130 may be pulled out of the first body 1 to be expanding between the first and second bodies 1 and 2 in the length direction C2 of the rollable display 3 or may be returned to the inside of the first body 1 to be accommodated in the width direction C1 of the rollable display 3.

The first sprockets 122 and 123 and the second sprocket 132 may be connected by a power connection device such that the first and second support members 120 and 130 are synchronously pulled out of/inserted into the first body 1. The power connection device may include, for example, gears, belts, timing belts, or wires. Gears 123a and 132a are respectively provided at the first sprocket 123 and the second sprocket 132. The gears 123a and 132a are connected to each other via gears 141 and 142. The first sprockets 122 and 123 are connected to each other via a timing belt 147.

Figure 7:
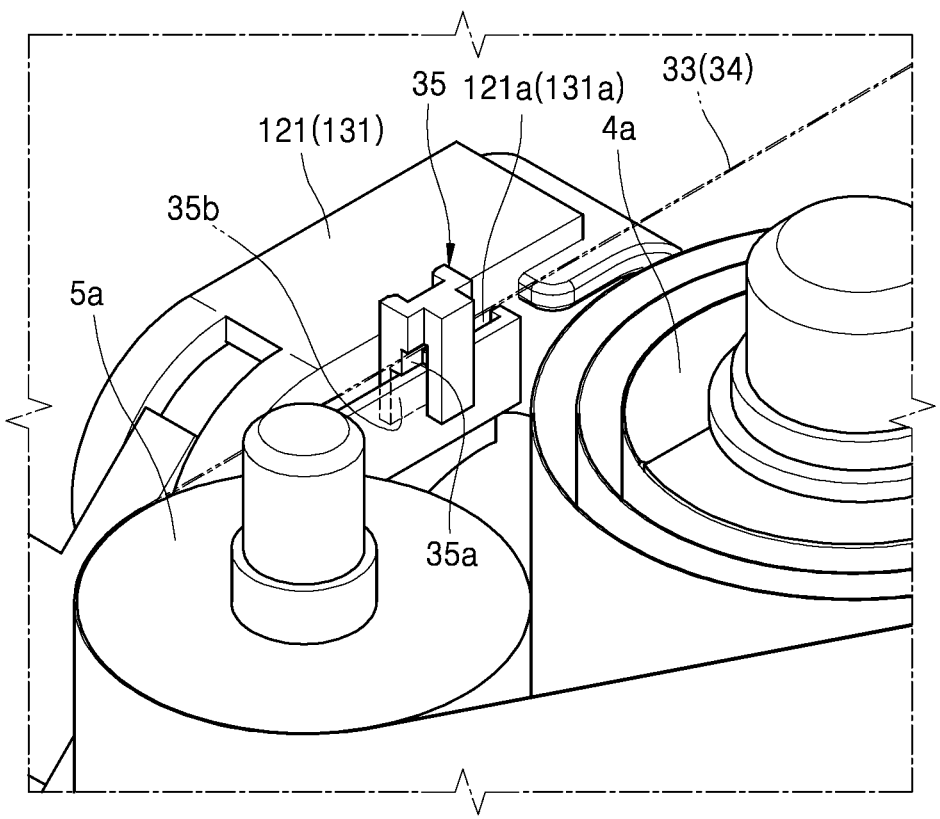
FIG. 7 is a perspective view illustrating a connection relation between an edge of a rollable display and a first support member according to an embodiment of the present disclosure.

FIG. 7 is a perspective view illustrating a connection relation between an edge of a rollable display and a first support member according to an embodiment of the present disclosure.

Referring to FIG. 7, since a connection relationship between the edge 34 of the rollable display 3 and the second support member 130 and a connection relationship between the edge 33 of the rollable display 3 and the first support member 120 are the same, reference numerals in parentheses in FIG. 7 indicate the connection relationship between the edge 34 of the rollable display 3 and the second support member 130.

The edges 33 and 34 are provided with a plurality of clips 35. The clips 35 may correspond to the segmented links 121 and 131 of the first and second support members 120 and 130. Accordingly, a pitch of the clips 35 may be the same as a pitch of the first and second segmented links 121 and 131. The clips 35 may include a fixing portion 35a for fixing the edges 33 and 34 of the rollable display 3, and an insertion portion 35b formed to be stepped from the fixing portion 35a and inserted in insertion grooves 121a and 131a of the first and second segmented links 121 and 131. As the insertion portion 35b of the clips 35 is inserted into the insertion grooves 121a and 131a, while the rollable display 3 and the first and second support members 120 and 130 move altogether in the length direction C2, the edges 33 and 34 of the rollable display 3 between the first and second bodies 1 and 2 may be supported by the first and second support members 120 and 130, respectively.

For example, when the first and second bodies 1 and 2 are separated from each other, the rollable display 3 is released from the roller 4a and guided by the guide roller 5a to be pulled out of the first body 1 through the opening 11a. As the first and second bodies 1 and 2 are separated from each other, the first and second support members 120 and 130 are pulled out of the first body 1. Then, the first sprockets 122 and 123 and the second sprocket 132 rotate to allow the first and second support members 120 and 130 to be pulled out of the first body 1. A movement direction of the first and second segmented links 121 and 131 of the first and second support members 120 and 130 is changed by the first and second sprockets 122 and 132 from the width direction C1 to the length direction C2. When the movement direction of the first and second segmented links 121 and 131 is changed, the insertion portion 35b of the clips 35 is inserted into the insertion grooves 121a and 131a of the first and second segmented links 121 and 131, and the first and second support members 120 and 130 are pulled out of the first body 1 through the opening 11a. Referring to FIG. 6, as the rollable display 3 and the first and second support members 120 and 130 are pulled out of the first body 1, the insertion portion 35b of the clips 35 are sequentially inserted into the insertion grooves 121a and 131a of the first and second segmented links 121 and 131 and the rollable display 3 and the first and second support members 120 and 130 altogether are pulled out of the first body 1.

Although the first and second segmented links 121 and 131 are connected to be relatively pivotable in the length direction C2, a pivot range thereof is limited. In other words, the pivot is not limited in a direction to be wound around the first sprockets 122 and 123 and the second sprocket 132, but the pivot is not allowed in an expanded state. Accordingly, when the rollable display 3 is pulled out of the first body 1, the rollable display 3 may be supported by the first and second support members 120 and 130 to be substantially planar.

When the first and second bodies 1 and 2 approach each other, the rollable display 3 and the first and second support members 120 and 130 are inserted into the first body 1 through the opening 11a. When the movement direction of the first and second segmented links 121 and 131 is changed by the first sprocket 122 and the second sprocket 132, the insertion portion 35b of the clips 35 is separated from the insertion grooves 121a and 131a to escape from the insertion grooves 121a and 131a. The rollable display 3 is wound around the roller 4a after passing the guide roller 5a. As the first and second support members 120 and 130 are inserted into the first body 1, the first sprockets 122 and 123 and the second sprocket 132 rotate in a direction to allow the first and second support members 120 and 130 to be inserted into the first body 1. Accordingly, referring to FIG. 5, the first and second support members 120 and 130 may be accommodated in the first body 1.

Figure 8:
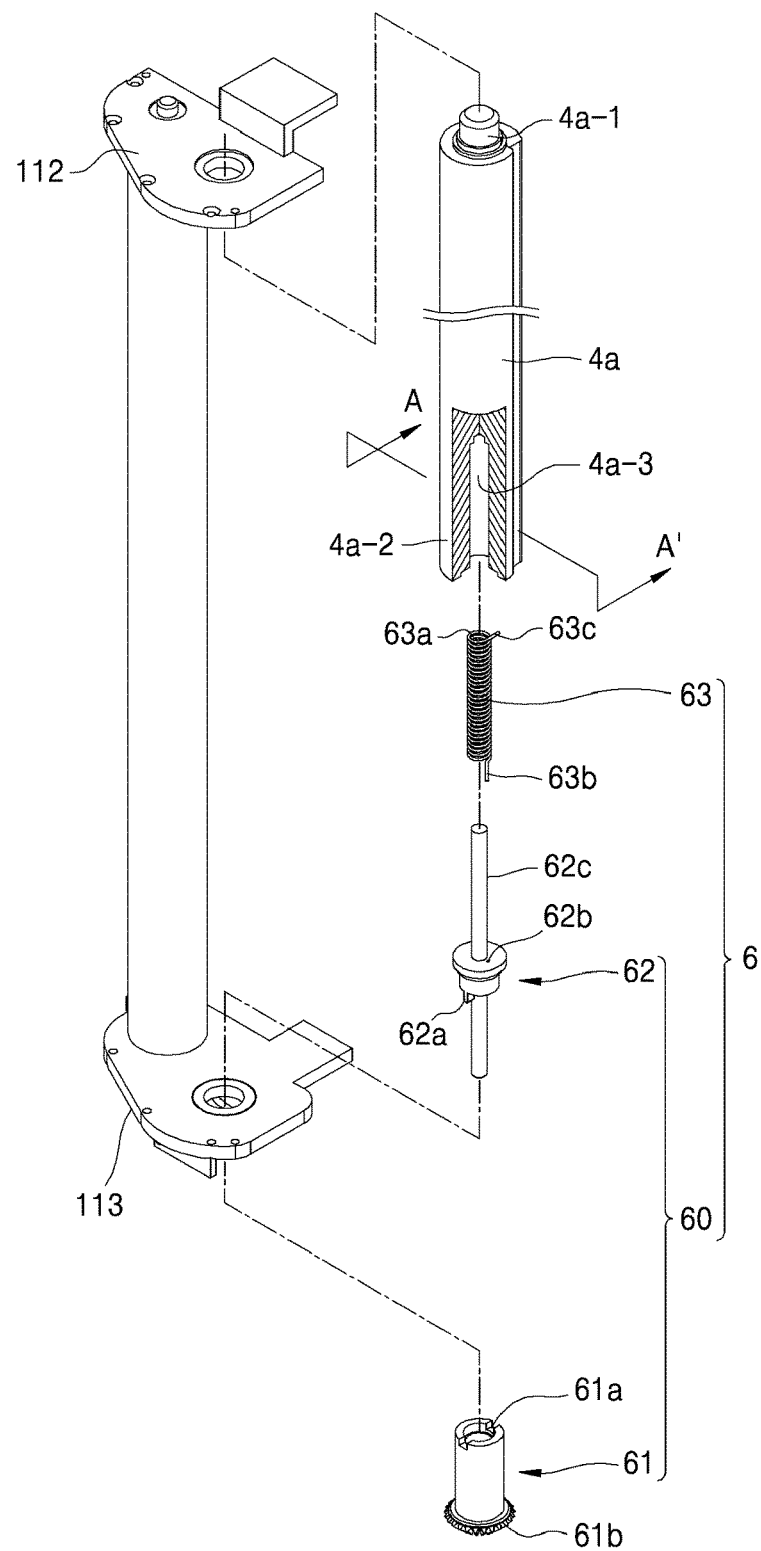
FIG. 8 is an exploded perspective view of a tensile force application portion according to an embodiment of the present disclosure.
Figure 9:
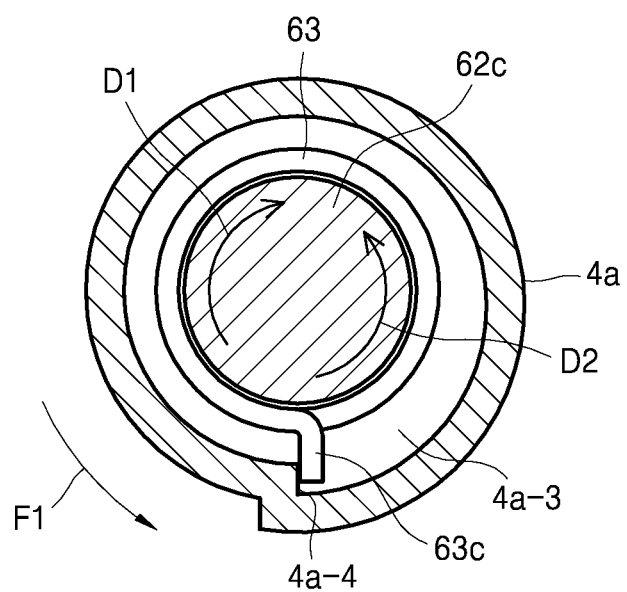
FIG. 9 is a cross-sectional view of FIG. 8 taken along line A-A' according to an embodiment of the present disclosure.

FIG. 8 is an exploded perspective view of the tensile force application portion according to an embodiment of the present disclosure. FIG. 9 is a cross-sectional view of FIG. 8 taken along line A-A' according to an embodiment of the present disclosure.

Referring to FIGS. 8 and 9, an end portion 4a-1 of the roller 4a is rotatably supported on the flange 112. Another end portion 4a-2 of the roller 4a is rotatably supported on the flange 113 via a tensile force application portion 6.

The tensile force application portion 6 is supported on the first body 1 to be rotatable in the same direction as the roller 4a when the rollable display 3 is extended or retracted. The tensile force application portion 6 may include a torsion spring 63 and a rotation support member 60, on which an end portion 63b of the torsion spring 63 is supported, the rotation support member 60 being rotatably supported on the flange 113. The rotation support member 60 may include a bushing member 61 rotatably supported on the flange 113 and a shaft member 62 having a support shaft 62c to rotatably support the other end portion 4a-2 of the roller 4a. The bushing member 61 is rotatably supported on the flange 113. The shaft member 62 rotates with the bushing member 61. To this end, the bushing member 61 and the shaft member 62 are provided with first and second coupling portions 61a and 62a having complementary shapes to be coupled to each other in a rotation direction. The support shaft 62c is inserted into an inner diameter portion 63a of the torsion spring 63. The one end portion 63b of the torsion spring 63 is fixed to the shaft member 62. For example, the one end portion 63b of the torsion spring 63 is inserted into a fixing hole 62b formed in the shaft member 62. The roller 4a is provided with a cavity portion 4a-3. The torsion spring 63 is inserted into the cavity portion 4a-3 while inserted over the support shaft 62c. A catch portion 4a-4 for catching the other end portion 63c of the torsion spring 63 is provided in the cavity portion 4a-3.

According to the above-described structure, the roller 4a may be configured to have the one end portion 4a-1 rotatably supported on the flange 113 and the other end portion 4a-2 rotatably supported on the flange 113 via the tensile force application portion 6. Referring to FIG. 9, an initial elastic force F1 in a direction to wind the rollable display 3 may be applied to the roller 4a by rotating the rotation support member 60 in a direction D1. A tensile force in a direction in which the rollable display 3 flatly expands may be applied to the rollable display 3 by the initial elastic force F1.

When the initial elastic force F1 is active and when the rotation support member 60 is in a free state in which the rotation of the rotation support member 60 is not restricted, the rotation support member 60 rotates in a direction D2, which is opposite to the direction D1, and the initial elastic force F1 may not be applied to the roller 4a. Thus, the rotation support member 60 needs to be locked to prevent rotation when the initial elastic force F1 is applied to the roller 4a.

Referring to FIGS. 5, 6, and 8, when the initial elastic force F1 is applied to the roller 4a, the rotation support member 60 is connected to at least one of the first and second support members 120 and 130. In other words, the rotation support member 60 is connected to at least one of the first and second support members 120 and 130 and locked in the state in which the initial elastic force F1 is applied to the roller 4a. When at least one of the first and second support members 120 and 130 moves, the rotation support member 60 rotates accordingly. For example, the rotation support member 60 is connected to the first sprockets 122 and 123 and/or the second sprocket 132. Accordingly, when the first sprockets 122 and 123 and/or the second sprocket 132 do not rotate, the rotation support member 60 does not rotate and is in a locked state. When the first sprockets 122 and 123 and/or the second sprocket 132 rotate, the rotation support member 60 also rotates.

A gear portion 61b is provided on the rotation support member 60, for example, the bushing member 61. The gear portion 61b is connected to the first sprockets 122 and 123 and/or the second sprocket 132. For example, the gear portion 61b is connected to the first sprockets 122 and 123 and/or the second sprocket 132 via gear 143, gear 144, gear 145, and gear 146. Since the rotation directions of the roller 4a and the rotation support member 60 are perpendicular to the rotation direction of the first and second sprockets 122, 123, and 132, one of the gears 143 to 146 has a structure of capable of changing the rotation direction by 90°. For example, the gear 146 may include a spur gear portion 146a connected to the gear 145 and a bevel gear portion 146b coaxially rotating with the spur gear portion 146a. The gear portion 61b is a bevel gear to be meshed with the bevel gear portion 146b. According to the above-described structure, the rotation support member 60 rotates interlocked with the rotation of the first and second sprockets 122, 123, and 132 according to the movements of the first and second support members 120 and 130.

When the gear portion 61b is meshed with the bevel gear portion 146b when the initial elastic force F1 in the direction to wind the rollable display 3 is applied to the roller 4a by rotating the rotation support member 60 in the direction D1, the rotation support member 60 may be maintained. Also, when the first and second bodies 1 and 2 move with respect to each other when the rollable display 3 is extended or retracted, the roller 4a rotates in the direction D1 or D2. The rotation support member 60 rotates in the direction D1 or D2.

Figure 10:
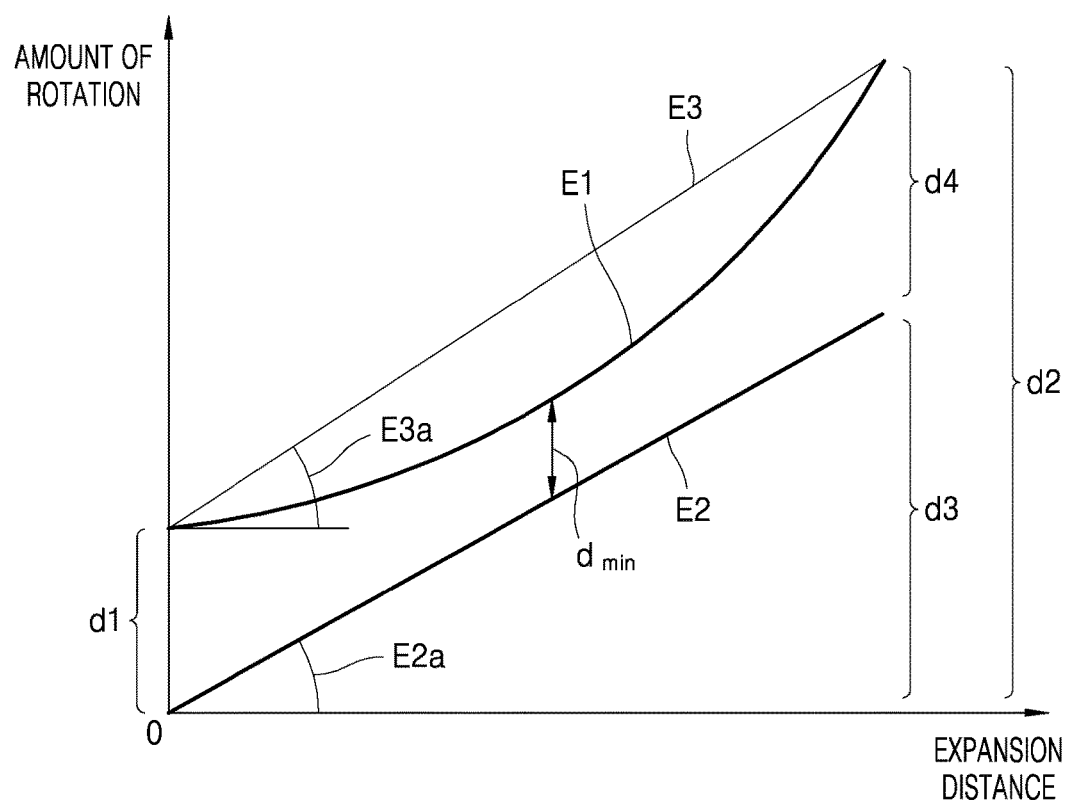
FIG. 10 is a graph of a relationship between an expansion distance of the rollable display, a rotation amount of a roller, and a rotation amount of a rotation support member according to an embodiment of the present disclosure.

FIG. 10 is a graph of a relationship between an expansion distance of the rollable display, a rotation amount of the roller, and a rotation amount of the rotation support member according to an embodiment of the present disclosure.

Referring to FIG. 10, when the expansion distance is "0", the initial rotation amount of the roller 4a is "d1". The initial rotation amount "d1" signifies a relative rotation amount with respect to the rotation support member 60 to apply the initial elastic force F1.

The rotation amount of the roller 4a has no linearly proportional relation with the expansion distance of the rollable display 3. This is because the outer diameter of the roller 4a including the rollable display 3 varies according to the amount of the rollable display 3 that is wound around the roller 4a. In other words, when the amount of the rollable display 3 wound around the roller 4a is relatively small, the rotation amount of the roller 4a with respect to a change in the same expansion distance is greater than a case in which the amount of the rollable display 3 wound around the roller 4a is relatively large. Accordingly, the relation between the expansion distance and the rotation amount of the roller 4a has a non-linear shape in which an incline gradually increases as the expansion distance increases as indicated by a curve E1.

If the rotation support member 60 does not rotate, when the rollable display 3 is fully pulled out of the first body 1, the rotation amount of the roller 4a is "d2". The amount of an elastic force F2 (not shown) provided by the torsion spring 63 to the roller 4a is proportional to the rotation amount d2. Accordingly, when the rollable display 3 is fully pulled out of the first body 1, the elastic force F2, which is very strong, is applied to the roller 4a. Accordingly, as the expansion distance of the rollable display 3 increases, a larger force is needed to separate the first and second bodies 1 and 2.

According to the present embodiment, as the rollable display 3 is extended from or retracted into the first body 1, the rotation support member 60 rotates with the roller 4a. Since the expansion distance of the rollable display 3 with respect to the first body 1 is the same as the movement amount of the first and second support members 120 and 130, the rotation amount of the rotation support member 60 has a linearly proportional relation with the expansion distance of the rollable display 3 with respect to the first body 1. Accordingly, the relation between the expansion distance and the rotation amount of the rotation support member 60 has a linear shape having an incline E2a as indicated by a straight line E2 in FIG. 10.

An amount of an elastic force applied by the torsion spring 63 to the roller 4a is proportional to a difference between the rotation amount of the roller 4a and the rotation amount of the rotation support member 60. In other words, the amount of an elastic force applied by the torsion spring 63 to the roller 4a when the rollable display 3 is fully pulled out of the first body 1 is proportional to a rotation amount d4. Accordingly, when the rotation support member 60 rotates with the roller 4a, an elastic force F2' that is present when the rollable display 3 is fully pulled out of the first body 1 is smaller than the elastic force F2 that is present when the rotation support member 60 does not rotate. Accordingly, a change in the amount of the tensile force applied to the rollable display 3 may be reduced and, thus, a change in the force consumed in the expansion process of the rollable display 3 may be reduced. Also, danger of damage to the connection between the one end portion 31 and the other end portion 32 of the rollable display 3 and the first and second bodies 1 and 2 may be reduced.

The incline E2a may be adjusted by a connection ratio of the gear portion 61b and the first and second sprockets 122, 123, and 132. For example, the incline E2a may be adjusted by making one or more of the gears 143 to 146 a reduction gear. By appropriately setting a gear ratio of the reduction gear, a minimum value $d_{min}$ of a difference between the rotation amount of the roller 4a and the rotation amount of the rotation support member 60 is equal to or greater than a value for flatly maintaining the rollable display 3 and generating a minimum elastic force needed to rotate the roller 4a when the rollable display 3 is to be released or wound. The incline E2a may be set to be identical to an incline E3a of a straight line E3 connecting the initial rotation amount and a final rotation amount of the roller 4a. Accordingly, a change amount of the elastic force applied by the torsion spring 63 to the roller 4a according to the expansion distance of the rollable display 3 may be reduced.

Although a structure of pulling/inserting the rollable display 3 out of/into the first body 1 by manually approaching/separating the first and second bodies 1 and 2 is described in the above-described various embodiments, a structure of pulling/inserting the rollable display 3 out of/into the first body 1 by allowing the first and second bodies 1 and 2 to approach/separate from each other by using a motor is possible. For example, a motor rotates the first and second sprockets 122, 123, and 132 to drive the first and second support members 120 and 130 so that the first and second bodies 1 and 2 move with respect to each other, thereby pulling/inserting the rollable display 3 out of/into the first body 1. Referring back to FIG. 5, the electronic apparatus 1000 may include a motor 150 for moving the first and second bodies 1 and 2 by rotating the gear 144. As described above, the gear 144 is connected to the gear 132a of the second sprocket 132 via the gear 143. Also, the gear 132a is connected to the first sprocket 123 via the gears 141 and 142 and the gear 123a. The first sprocket 123 is connected to the first sprocket 122 via the timing belt 147. Accordingly, the first and second sprockets 122, 123, and 132 rotate by driving the motor 150 so that the first and second support members 120 and 130 expand to the outside of the first body 1, the first body 1 is moved away from the second body and the rollable display 3 is expanding between the first and second bodies 1 and 2.

When the first and second sprockets 122, 123, and 132 rotate in the opposite direction by driving the motor 150 so that the first and second support members 120 and 130 are inserted into the first body 1, the first and second bodies 1 and 2 move toward each other, and the roller 4a rotates in a direction to wind the rollable display 3 by the elastic force of the torsion spring 63. Accordingly, the rollable display 3 may be accommodated inside of the first body 1.

In this process, the motor 150 may rotate the rotation support member 60 in proportion to the expansion distance of the rollable display 3.

Figure 11:
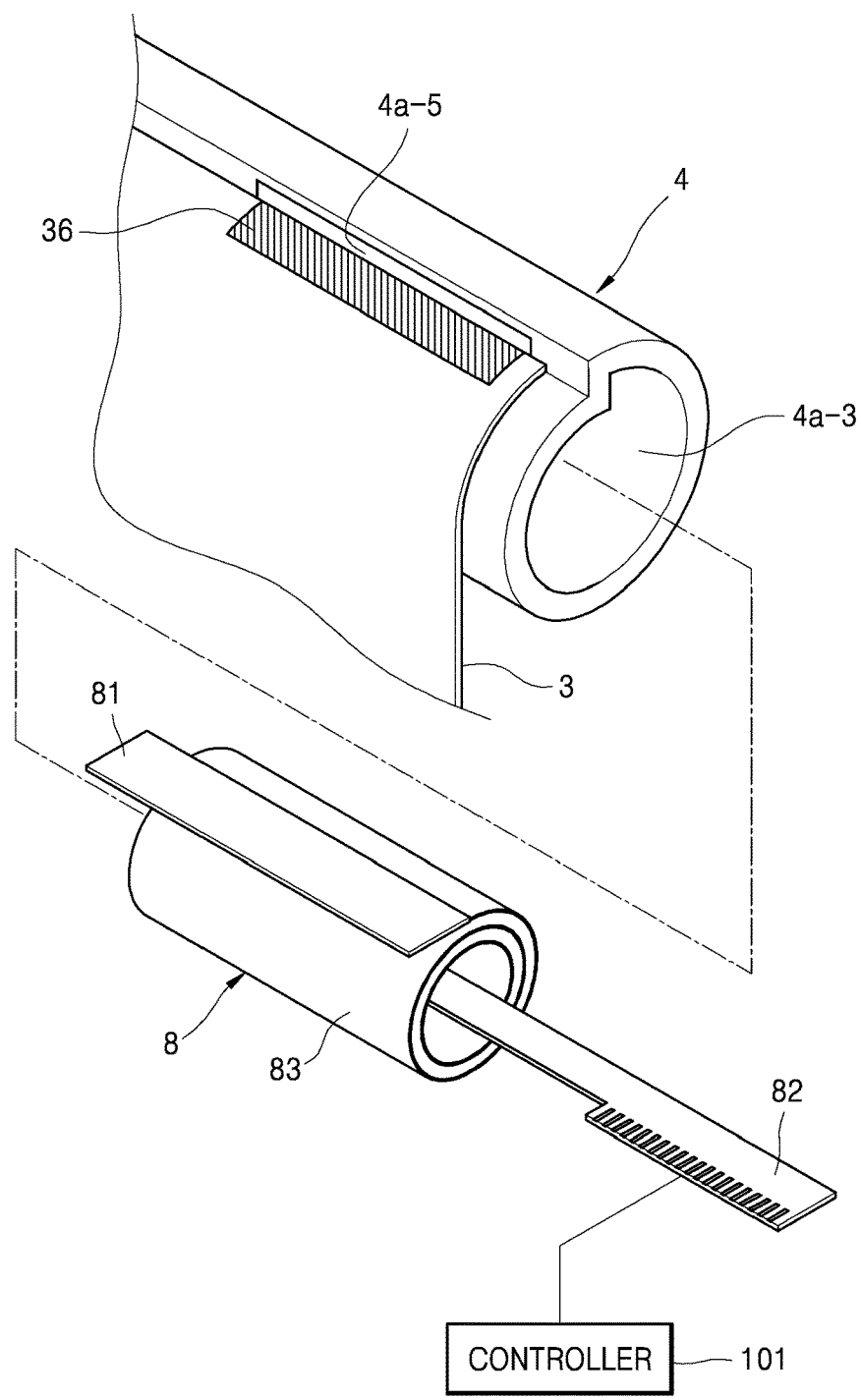
FIG. 11 is an exploded perspective view of an electrical connection structure between a rollable display and a controller according to an embodiment of the present disclosure.

FIG. 11 is an exploded perspective view of an electrical connection structure between a rollable display and a controller according to an embodiment of the present disclosure.

Referring to FIG. 11, the rollable display 3 is electrically connected to the controller 101 by a connection member 8 that is flexible. For example, the connection member 8 may be a flexible printed circuit board (FPCB). The connection member 8 may include a first connection portion 81 connected to the rollable display 3 and a second connection portion 82 connected to the controller 101. The first connection portion 81 may be electrically connected to, for example, a terminal portion 36 of the rollable display 3 by a method such as soldering. The first connection portion 81 may be electrically connected to the terminal portion 36 of the rollable display 3 by, for example, a connector method. The connection member 8 may also be integrally formed with the rollable display 3. The second connection portion 82 may be electrically connected to the controller 101 by, for example, a connector method.

The controller 101 may be arranged in the first body 1 on a printed circuit board. The roller 4a rotates as the rollable display 3 expands. Accordingly, the connection member 8 needs to maintain a stable connection between the rollable display 3 and the controller 101 despite the rotation of the roller 4a. To this end, a spiral portion 83 may be spirally wound multiple times between the first connection portion 81 and the second connection portion 82. The number of windings of the spiral portion 83 is the same as or greater than the maximum winding number of the rollable display 3 around the roller 4a. A winding direction of the spiral portion 83 is the same as a winding direction of the rollable display 3 around the roller 4a.

In this state, the connection member 8 is inserted in the cavity portion 4a-3 of the roller 4a, and the first connection portion 81 is pulled out of the roller 4a through a connection hole 4a-5 formed in the roller 4a to be connected to the terminal portion 36 of the rollable display 3. The second connection portion 82 is pulled out of the cavity portion 4a-3 through one end portion of the roller 4a to be connected to the controller 101.

According to the above structure, when the roller 4a rotates in a direction in which the rollable display 3 is wound or expands, since the rotation of the roller 4a is absorbed by the spiral portion 83, the electrical connection between the first connection portion 81 and the terminal portion 36, and the second connection portion 82 and the controller 101, may be maintained.

In the above-described embodiment, although a structure having one first body 1 is described, the scope of the present disclosure is not limited thereto.

Figure 12:
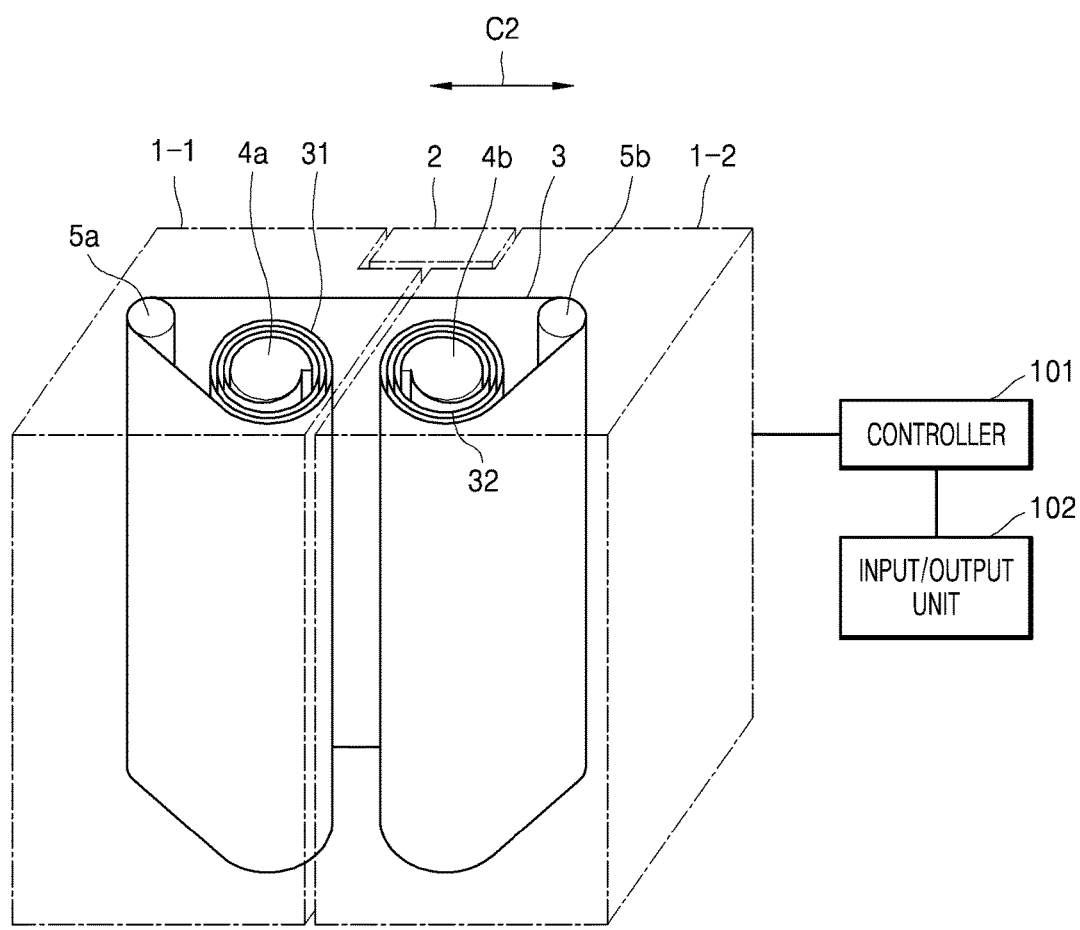
FIG. 12 is a schematic perspective view of an electronic apparatus having a rollable display device in a retracted position according to an embodiment of the present disclosure.

FIG. 12 is a schematic perspective view of an electronic apparatus having a rollable display device in a retracted position according to an embodiment of the present disclosure, and FIG. 13 is a schematic perspective view of an electronic apparatus having a rollable display device in an extended position according to an embodiment of the present disclosure.

Referring to FIGS. 12 and 13, the electronic apparatus 1000 may include a pair of the first bodies 1-1 and 1-2 and the second body 2. The first bodies 1-1 and 1-2 are arranged at opposing sides of the second body 2. In other words, the second body 2 is located between the first bodies 1-1 and 1-2 in the length direction C2 of the rollable display 3. The rollable display 3 is arranged across the second body 2. The one end portion 31 of the rollable display 3 is connected to the first roller 4a in the first body 1-1, and the other end portion 32 is connected to the second roller (sub-body roller) 4b in the first body (sub-body) 1-2. The first and second rollers 4a and 4b are rotatably provided in the first bodies 1-1 and 1-2, respectively. The rollable display 3 is wound around the outer circumference of the first and second rollers 4a and 4b.

The stand 7 of FIG. 4 may be applied to the electronic apparatus 1000 in FIGS. 12 and 13. In this case, the second body 2 may be fixed to the stand 7 and the first bodies 1-1 and 1-2 may be slidable in a direction to approach/be separated from the second body 2. For example, a sliding rail 71 may be provided between the first bodies 1-1 and 1-2 and the stand 7.

The first roller 4a is rotatably supported on the first body 1-1 and the second roller 4b is rotatably supported on the first body 1-2 similar to the structures described with reference to FIGS. 4, 8, and 9. Also, the tensile force application portion (sub-body tensile force application portion) 6 may be applied to the first and second rollers 4a and 4b.

The first and second support members 120 and 130, and the first and second sprockets 122, 123, and 132 to expand the first and second support members 120 and 130, are provided at each of the first bodies 1-1 and 1-2 as described above with reference to FIGS. 4, 5, 6, and 7. The first and second sprockets 122, 123, and 132 may synchronously rotate according to the above structure. The leading links 121-1 and 131-1 of the first and second segmented links 121 and 131 of the first and second support members 120 and 130 provided in the first body 1-1 may be fixed to the second body 2. Likewise, the leading links 121-1 and 131-1 of the first and second segmented links 121 and 131 of the first and second support members 120 and 130 provided in the first body 1-2 may be fixed to the second body 2. The first and second support members 120 and 130 respectively provided in the first bodies 1-1 and 1-2 may be driven by the motor 150.

The tensile force application portion 6 may include a pair of tensile force application portions connected to the first and second support members 120 and 130 and rotating in the same direction as the first and second rollers 4a and 4b. Each of the tensile force application portions has the same structure as the tensile force application portion 6.

The electrical connection structure of the rollable display 3 and the controller 101 described above with reference to FIG. 11 may be applied to the electronic apparatus 1000 of FIGS. 12 and 13. In other words, the connection member 8 is inserted in the cavity portion 4a-3 of any one of the first and second rollers 4a and 4b so that the first connection portion 81 may be connected to the terminal portion 4a-4 of the rollable display 3 and the second connection portion 82 may be connected to the controller 101.

Referring to FIGS. 11 and 12, when the first bodies 1-1 and 1-2 is separated from the second body 2 by rotating the motor 150 or by a manual operation, the first and second support members 120 and 130 are pulled out of the first bodies 1-1 and 1-2 and, thus, the rollable display 3 is pulled out of the first bodies 1-1 and 1-2 through the openings 11a and 11b provided in the first bodies 1-1 and 1-2, respectively, to be expanding between the first bodies 1-1 and 1-2 across the second body 2. As the rollable display 3 expands, the first and second rollers 4a and 4b rotate in a direction to release the rollable display 3.

When the first bodies 1-1 and 1-2 approach the second body 2 by rotating the motor 150 or by a manual operation, the first and second support members 120 and 130 are inserted into the first bodies 1-1 and 1-2 and, thus, the rollable display 3 is accommodated in the first bodies 1-1 and 1-2. The first and second rollers 4a and 4b rotate by the elastic force of the torsion spring 63 in a direction to wind the rollable display 3. Accordingly, the rollable display 3 is accommodated in the first bodies 1-1 and 1-2.

The first and second guide rollers 5a and 5b guide the rollable display 3 released from the first and second rollers 4a and 4b toward the openings 11a and 11b.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
    a first body and a second body configured to move with respect to each other;
    a rollable display;
    a roller rotatably supported in the first body; and
    a tensile force application portion,
    wherein a first end portion of the rollable display is fixed to the roller and the rollable display is wound around an outer circumference of the roller,
    wherein the tensile force application portion is configured to:
        apply an elastic force to the roller to rotate in a direction to wind the rollable display,
        rotate with the roller, and
        control the elastic force applied to the roller according to a distance between the first body and the second body to reduce a change in tensile force being applied to the rollable display,
    wherein, when the first body and the second body move with respect to each other, the rollable display is:
        wound around the roller to be accommodated in the first body, or
        unwound from the roller to expand between the first body and the second body in a length direction, and
    wherein the tensile force application portion comprises:
        a rotation support member rotated by being connected to a support member comprising a plurality of segmented links sequentially connected to be relatively pivotable in the length direction, and
        a torsion spring having a first end portion connected to the roller and a second end portion connected to the rotation support member.

2. The electronic apparatus of claim 1, wherein the tensile force application portion is further configured to rotate in proportion to an expansion distance of the rollable display.

3. The electronic apparatus of claim 2,
    wherein the support member is accommodated in the first body with the rollable display and expands from the first body to support the rollable display, and
    wherein the tensile force application portion rotates by being connected to the support member.

4. The electronic apparatus of claim 3, further comprising:
    a sprocket rotatably provided in the first body to move the support member,
    wherein the rotation support member rotates by being connected to the sprocket.

5. The electronic apparatus of claim 4, further comprising: a motor configured to rotate the sprocket.

6. The electronic apparatus of claim 1, further comprising:
    a controller configured to control the rollable display; and
    a flexible connection member comprising:
        a spiral portion that is spirally wound multiple times,
        a first connection portion extending from the spiral portion and connected to a terminal portion of the rollable display, and
        a second connection portion extending from the spiral portion and connected to the controller.

7. The electronic apparatus of claim 6, wherein a number of windings of the spiral portion is equal to or greater than a maximum winding number of the rollable display around the roller.

8. The electronic apparatus of claim 6, wherein a winding direction of the spiral portion is the same as a winding direction of the rollable display around the roller.

9. The electronic apparatus of claim 1, further comprising:
    a sub-body facing the first body with respect to the second body and configured to move with respect to the second body, wherein the sub-body comprises:
        a sub-body roller rotatably supported in the sub-body, and
        a sub-body tensile force application portion,
    wherein a second end of the rollable display is fixed to the sub-body roller and the rollable display is wound around an outer circumference of the sub-body roller, and
    wherein the sub-body tensile force application portion is configured to:
        apply an elastic force to the sub-body roller to rotate in a direction to wind the rollable display, and
        rotate with the sub-body tensile roller.

10. An electronic apparatus comprising:
a first body and a second body configured to move with respect to each other;
a rollable display;
a roller rotatably supported in the first body; and
a tensile force application portion,
wherein a first end portion of the rollable display is fixed to the roller and the rollable display is wound around an outer circumference of the roller,
wherein the tensile force application portion is configured to:
apply an elastic force to the roller to rotate in a direction to wind the rollable display,
rotate with the roller, and
control the elastic force applied to the roller according to a distance between the first body and the second body,
wherein, when the first body and the second body move with respect to each other, the rollable display is:
wound around the roller to be accommodated in the first body, or
unwound from the roller to expand between the first body and the second body in a length direction,
wherein the tensile force application portion is further configured to rotate in proportion to an expansion distance of the rollable display, and
wherein the tensile force application portion comprises:
a rotation support member supported on the first body and configured to be rotatable in proportion to the expansion distance of the rollable display, and
a torsion spring having a first end portion connected to the roller and a second end portion connected to the rotation support member.

11. The electronic apparatus of claim 10, further comprising:
a motor configured to rotate the rotation support member in proportion to the expansion distance of the rollable display.

12. The electronic apparatus of claim 10, further comprising:
a motor configured to move the first body with respect to the second body,
wherein the rotation support member is rotated by the motor.

13. An electronic apparatus comprising:
a first body and a second body configured to move with respect to each other;
a roller rotatably supported in the first body;
a rollable display wound around the roller;
a torsion spring having a first end connected to the roller; and
a rotation support member,
wherein, when the first body and the second body move with respect to each other,
the rollable display being wound around the roller to be accommodated in the first body or unwound from the roller to expand between the first body and the second body in a length direction, and
the torsion spring controls an elastic force applied to the roller according to a distance between the first body and the second body, and
wherein a second end of the torsion spring is connected to the rotation support member and the rotation support member is supported in the first body to be rotatable in proportion to an expansion distance of the rollable display.

14. The electronic apparatus of claim 13, further comprising:
a motor configured to rotate the rotation support member in proportion to the expansion distance of the rollable display.

15. The electronic apparatus of claim 13, further comprising:
a support member comprising a plurality of segmented links sequentially connected to be relatively pivotable in the length direction,
wherein the support member is accommodated in the first body with the rollable display and expands from the first body to support the rollable display, and
wherein the rotation support member rotates by being connected to the support member.

16. The electronic apparatus of claim 15, further comprising:
a sprocket rotatably provided in the first body to move the support member,
wherein the rotation support member rotates by being connected to the sprocket.

17. The electronic apparatus of claim 16, further comprising:
a motor configured to rotate the sprocket.

* * * * *